United States Patent
Ruiz et al.

(10) Patent No.: US 11,878,559 B2
(45) Date of Patent: Jan. 23, 2024

(54) SYSTEMS AND METHODS FOR DETERMINING TRAILER CONNECTION

(71) Applicant: Ford Global Technologies, LLC, Dearborn, MI (US)

(72) Inventors: J. Elias Ruiz, Atizapan (MX); Veronica Garza, Mexico City (MX); Mijail Avila, Cuautitlan Izcalli (MX); Cesar Sanchez Razo, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 459 days.

(21) Appl. No.: 17/193,624

(22) Filed: Mar. 5, 2021

(65) Prior Publication Data
US 2022/0281273 A1 Sep. 8, 2022

(51) Int. Cl.
*B60D 1/62* (2006.01)
*B60D 1/36* (2006.01)

(52) U.S. Cl.
CPC . *B60D 1/62* (2013.01); *B60D 1/36* (2013.01)

(58) Field of Classification Search
CPC .... B60D 1/36; B60D 1/62; B60D 1/64; B60R 16/0231; B60R 16/023; B60R 16/03; B60Q 11/005
See application file for complete search history.

(56) References Cited

U.S. PATENT DOCUMENTS

| | | | | |
|---|---|---|---|---|
| 9,199,521 | B2 * | 12/2015 | Brombach | B60D 1/62 |
| 9,738,125 | B1 * | 8/2017 | Brickley | B60D 1/62 |
| 2001/0040455 | A1 * | 11/2001 | Arlt | B60T 8/323 |
| | | | | 324/504 |
| 2005/0017856 | A1 * | 1/2005 | Peterson | B60Q 1/305 |
| | | | | 340/431 |
| 2013/0261843 | A1 * | 10/2013 | Kossira | B60T 8/172 |
| | | | | 701/1 |
| 2015/0183284 | A1 * | 7/2015 | Kim | G01R 19/0092 |
| | | | | 701/33.7 |
| 2019/0359018 | A1 | 11/2019 | Brickley et al. | |

FOREIGN PATENT DOCUMENTS

| | | |
|---|---|---|
| DE | 102015214337 B3 | 2/2017 |
| DE | 102018115178 A1 | 1/2020 |
| EP | 0483650 * | 5/1992 |
| EP | 2377723 A1 | 10/2016 |

OTHER PUBLICATIONS

English translation of foreign document EP 0483650 (Year: 1992).*
Techlink, "New Trailering App Trailer Connection And Lighting Diagnosis Update", GMC, Feb. 27, 2020, 7 pages.

* cited by examiner

*Primary Examiner* — Russell Frejd
*Assistant Examiner* — Brandon Z Willis
(74) *Attorney, Agent, or Firm* — Frank Lollo; Eversheds Sutherland (US) LLP (57) ABSTRACT

The systems and methods disclosed herein are configured to determine if a trailer is connected to a vehicle. The methods may include determining a connection during an off-state and an on-state of the vehicle. The determinations may be compared to determine whether to enable use of the off-state determination with respect to features of the vehicle.

20 Claims, 2 Drawing Sheets

FIG. 3

SYSTEMS AND METHODS FOR DETERMINING TRAILER CONNECTION

BACKGROUND

Many vehicles are designed to tow trailers. The vehicles typically include a connector at the rear of the vehicle near a trailer hitch or hitch receiver. The trailer hitch is a structure in which a trailer is coupled to a vehicle. The connector provides the electrical connection for the vehicle-trailer interaction such as providing power to components of the trailer including running lights, stop lights, turn lights, backup lights, cameras, and/or electric brakes, etc.

It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to determine if a trailer is connected to a vehicle. The methods may include determining a connection during an off-state and an on-state of the vehicle. The determinations may be compared to determine whether to enable use of the off-state determination with respect to features of the vehicle.

Figures 1, 2:
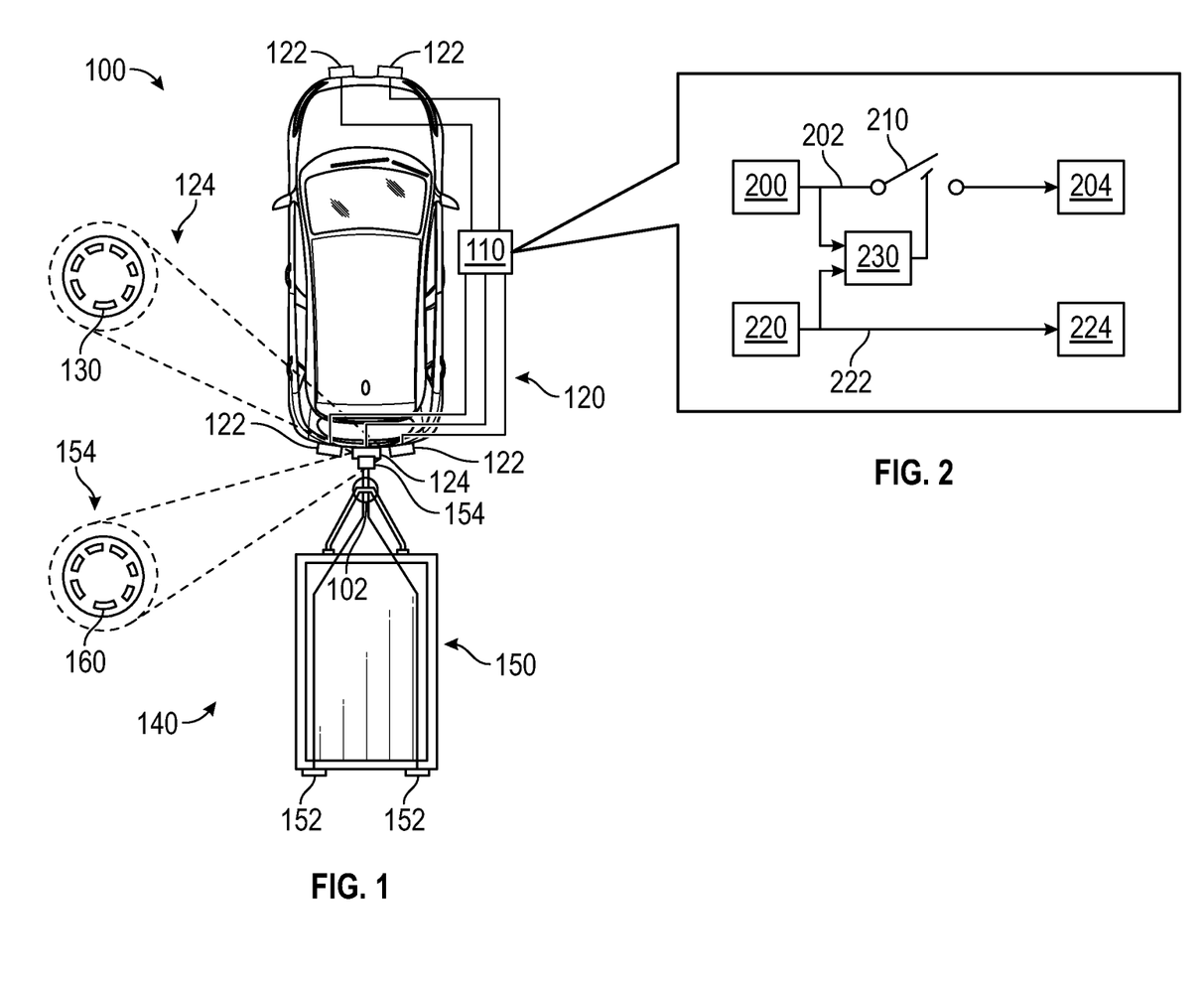
FIG. 1 depicts a vehicle and a trailers and a controller in accordance with the present disclosure.
FIG. 2 depicts the controller of FIG. 1 in accordance with the present disclosure.

Referring to FIG. 1, a vehicle 100 includes a controller 110 (e.g., a body control module (BCM))) for a vehicle electrical system 120. The controller 110 may include drivers such as intelligent metal oxide semiconductor field effect transistors (MOSFETs) to supply power to the vehicle electrical system 120.

The vehicle electrical system 120 includes lights 122 such as exterior lights and interior lights. Exterior lights include headlights, tail lights, and running lights. Interior lights include dome lights, ambient lights, and door lights.

The vehicle electrical system 120 also includes a vehicle connector 124. The vehicle connector 124 may include electrical connections or contacts 130 that allow a trailer 140 to connect to the vehicle electrical system 120. In particular, a trailer electrical system 150 includes lights 152 and a trailer connector 154. The trailer connector 154 includes electrical connections or contacts 160.

The vehicle connector 124 and the trailer connector 154 may be connected such that the contacts 130 are in contact with the contacts 160. Exemplary connectors include a 4-way connector, a 7-way connector, combinations thereof, and the like. The vehicle connector 124 may be a socket and the trailer connector 154 may be a plug.

Once the vehicle connector 124 and the trailer connector 154 are connected, the vehicle 100 can supply power to electrical components of the trailer electrical system 150 in unison with (or independent of) electrical components of the vehicle electrical system 120 and in response to vehicle operations (e.g., brakes, open door). For example, the controller 110 can control the rear lights 122 of the vehicle 100 as well as rear lights 152 and electric brakes of the trailer 140 in response to the brake pedal of the vehicle 100 being engaged.

The controller 110 is configured to detect connection between the vehicle connector 124 and the trailer connector 154. In particular the controller 110 applies a voltage across the contacts 130 of the vehicle connector 124 and measures impedance, resistance, conductivity, or another electrical property between the contacts 130.

If the trailer connector 154 is connected to the vehicle connector 124, the additional resistance of the lights 152 (and/or other electrical components) of the trailer electrical system 150 may be detected when the voltage is applied across the contacts 130 of the vehicle connector 124. For example, measurements that fall within a detection range indicate that the trailer connector 154 is connected to the vehicle connector 124.

However, environmental factors such as corrosion, snow, ice, rain, salt spray, dust, dirt, mud, and/or other debris may create resistance (e.g., resistive paths) between contacts 130 of the vehicle connector 124. As such, measurements between the contacts 130 due to resistive paths may fall within the detection range (e.g., a range of impedance) when the trailer connector 154 is not connected to the vehicle connector 124. Here, environmental factors can lead the controller 110 to indicate that a trailer connector 154 is connected to the vehicle connector 124 when in fact it is not.

In addition, the resistive paths may cause the measurements to fall outside of the detection range when the trailer connector 154 is connected to the vehicle connector 124. Here, environmental factors can lead the controller 110 to indicate that the trailer connector 154 is not connected to the vehicle connector 124 when in fact it is.

Referring to FIG. 2, to reduce or eliminate false positives and false negatives, the controller 110 includes an off-state trailer detection module 200 and an on-state trailer detection module 220 to detect a trailer connection.

The off-state trailer detection module 200 periodically performs an off-state trailer detection method during an off-state of the vehicle 100. For example, the off-state of the vehicle 100 may include when the ignition position is in a locked or off position. The off-state may be characterized as where an engine of the vehicle 100 is not running and/or where a battery of the vehicle 100 does not power accessories or the vehicle electrical system 120.

The off-state trailer detection module 200 is configured to use a voltage pulse to periodically or continuously determine an off-state determination 202 (or status) of a trailer connection. The off-state determination 202 is made without a separate event from a user (e.g., without waiting for trailer lights to be powered when the vehicle 100 is in an on-state). Here, a connection between the vehicle connector 124 and the trailer connector 154 may be immediately or quickly detected. The off-state determination 202 may be used for off-state features 204 of the vehicle 100 such as a trailer alarm.

To conserve battery power, the off-state trailer detection module 200 periodically applies low-voltage pulses (e.g., short duration). Low voltage may include a voltage that is lower than the operating voltage or battery voltage of the vehicle 100. For example, low voltage may include 5V or 3.3V and battery voltage may be 12V.

The off-state trailer detection module 200 measures impedance, resistance, conductivity, or another electrical property between the contacts 130 of the vehicle connector 124. If the trailer connector 154 is connected to the vehicle connector 124, the additional resistance may be detected when the measurements that fall within a detection range.

The off-state trailer detection method is sensitive to environmental factors and differences in trailer electrical systems 150 (e.g., lights, electrical characteristics, and wiring) as these factors may have an effect on the measurements from low-voltage pulses.

A switch 210 (e.g., implemented through software logic) is used to determine if use of the off-state determination 202 is enabled or disabled for the off-state features 204. If the switch 210 is closed, use of the off-state determination 202 is enabled for the off-state features 204. If the switch 210 is open, use of the off-state determination 202 is disabled for the off-state features 204.

The on-state trailer detection module 220 performs an on-state method in response to an on-state event of the vehicle 100. For example, an on-state event includes the ignition in an "on" or accessory mode, when the engine of the vehicle 100 is running, at the time of ignition, or any event where the battery powers any accessories (e.g., the vehicle electrical system 120 components) such as opening a door, unlocking the vehicle or an alarm, pressing on the brake, and/or any other events that cause the lights to flash or turn on.

The on-state trailer detection module 220 measures impedance, resistance, conductivity or another electrical property between the contacts 130 of the vehicle connector 124. If the trailer connector 154 is connected to the vehicle connector 124, the additional resistance may be detected when the measurements fall within a detection range.

In the on-state, the voltage that is applied due to the on-state event may be at or closer to the operating voltage or battery voltage and the duration is longer (e.g., at least two seconds). The on-state trailer detection method is less sensitive to environmental factors and differences in trailer electrical systems 150 (e.g., lights, electrical characteristics, and wiring) as these factors may have less of an effect on the measurements from higher voltage and duration.

The on-state determination 222 (or status) is used for on-state features 224 of the vehicle 100 such as providing voltage or signals to the vehicle connector 124 to control components of the trailer electrical system 150.

In addition, on-state features 224 include setting a notice for the driver. For example, if the on-state determination 222 is that a trailer 140 is connected, an instrument cluster indicates "Trailer Connected." If the on-state determination 222 is that the trailer 140 is disconnected (e.g., if the trailer was previously connected), the instrument cluster indicates "Trailer Disconnected."

The on-state determination 222 is used to check the reliability of the off-state determination 202. In particular, the on-state determination 222 is compared to the off-state determination 202 to determine whether to open or close the switch 210 (e.g., enable or disable the off-state determination 202). If the switch 210 is open, use of the off-state determination 202 is disabled for controlling the features 204. If the switch 210 is closed, use the off-state determination 202 is enabled for controlling the features 204. For example, the off-state determination 202 may be used to control an alarm system during an off-state of the vehicle 100.

To control the switch 210, an XNOR gate 230 or a software logic equivalent may be used. Here, the on-state determination 222 and the off-state determination 202 may be inputs to the XNOR gate 230 and the output of the XNOR gate 230 may be used to control the switch 210.

Each of the on-state determination 222 and the off-state determination 202 may be a binary number, for example, with a determination of "not connected" being represented by a "zero" and a determination of "connected" being represented by a "one".

If the determinations 202, 222 are the same, the XNOR gate 230 returns a "one" and "one" is a control to close the switch 210. If the determinations 202, 222 are different, the XNOR gate 230 returns a "zero" and "zero" is a control to open the switch 210.

Accordingly, if the off-state determination 202 agrees with the on-state determination 222, the switch 210 is closed. If the off-state determination 202 disagrees with the on-state determination 222, the switch 210 is open.

Use of the off-state determination 202 may be at least temporarily disabled if the off-state determination 202 is different from the on-state determination 222. In other words, the off-state determination 202 may be used until an on-state determination 222 conflicts with the off-state determination 202 and may thereafter be reinstated if the off-state determination 202 agrees with the on-state determination 222.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Referring to FIG. 1, the vehicle 100 includes a hitch 102 (also referred to as a tow hitch, a tow bar, a trailer hitch, hitch point etc.) that is located at the back end of the vehicle 100. For example, the hitch is coupled to and extends from a chassis of the vehicle 100.

The vehicle 100 may take the form of another passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

The vehicle 100 includes the controller 110 (e.g., a body control module (BCM) described in further detail below)) for the vehicle electrical system 120. The controller 110 may include drivers such as intelligent metal oxide semiconductor field effect transistors (MOSFETs) to supply power to the vehicle electrical system 120.

The vehicle electrical system 120 includes lights 122 such as exterior lights and interior lights. Exterior lights include headlights, tail lights, and running lights. Interior lights include dome lights, ambient lights, and door lights.

Exterior lights 122 are schematically illustrated in FIG. 1. Exterior lights may include a headlight that may have a high-beam setting and a low-beam setting. The low-beam setting limits an intensity and height of the light beam from the headlight, while the high-beam setting typically has an illumination pattern greater than the illumination pattern of the low beam setting.

Another exterior light is a front turn signal. Vehicles typically have a left front turn signal and a right front turn signal. Some vehicles have fog lights also referred to as driving lights. The vehicle 100 may also include front running lights; however, some vehicles may utilize turn signals in place of running lights by using a single multi-filament bulb or multiple single filament bulbs in the front turn signals. Front cornering lights are usually illuminated while the running lights are illuminated. A mirror light may be illuminated along with the running lights. The mirror light may have a single bulb having a dual filament arrangement or may have multiple single filament bulbs such that an intensity of the mirror light flashes when the turn signals are activated.

In some implementations, a vehicle may also have a quarter panel light located between the front wheels well and the hinge plane of the front door. The quarter panel light may be illuminated along with the running lights and similar to the minor light may have a dual filament arrangement such that the intensity increases and decreases when the turn signals are activated.

The vehicle 100 may also have a puddle light that is typically white and configured to illuminate an area of the ground to the side of the vehicle 100. The puddle light may be activated when the vehicle is stationary to illuminate a side of the vehicle 100 such as when the vehicle is parked and people are entering the vehicle 100 and exiting the vehicle 100.

The rear of the vehicle 100 has tail lights also referred to as rear lights or back lights, such as a right and a left tail light that may be light together indicative of application of a brake of the vehicle, flashing together indicative of a hazard signal, or flashing independently indicative of activation of a turn signal. In some implementations, the running lights may activate at an increased intensity, i.e., high intensity, according to activation of brakes, turn signals, or a hazard switch.

A back-up light is typically activated when a transmission mode to reverse the vehicle is selected. The back-up light is typically white and is designed to illuminate an area proximate to the rear of the vehicle 100. The back-up lights are typically brighter than other rear facing lights, and may be activated when the vehicle 100 is stationary or parked to illuminate the area proximate to the rear of the vehicle 100. The vehicle may have dedicated rear running light; however, some vehicles may utilize the rear turn signals in place of rear running lights by using a single multi-filament bulb or multiple single filament bulbs in the rear turn signal.

A rear license plate light usually illuminates an area around the license plate with a white light. Rear cornering lights are usually illuminated while the running lights are illuminated. Also, the vehicle 100 may include a center high mount stop light (CHMSL).

The vehicle electrical system 120 also includes a vehicle connector 124. The vehicle connector 124 may include contacts 130 that allow the trailer 140 to connect to the vehicle electrical system 120. The vehicle connector 124 may also be referred to as a trailer plug connector or a trailer plug receptacle.

The vehicle connector 124 may be disposed on the rear of the vehicle 100 near a trailer hitch. The vehicle connector 124 provides an electrical connection from the vehicle 100 to the trailer. The vehicle connector 124 may be electrically connected in parallel with the rear tail lights 122 or may be electrically connected to the controller 110.

An exemplary configuration of the contacts 130 for a round 7-way vehicle connector 124 is now described. The vehicle connector 124 include a combination 4-way and 7-way connector, may include a single connector such as a flat 4-way connector or a round 7-way connector, other vehicle trailer connectors, and the like.

A ground contact 130 is a ground connection to a chassis of a trailer. The ground contact 130 typically uses a 12 AWG conductor. When measuring conductivity, resistance, or an impedance of a load on the trailer, the measurement is typically measured using ground contact 130 as a reference.

A first signal contact 130 is coupled with a left turn signal, stop lamp. The first signal contact typically uses a 16 AWG conductor. Conductivity, resistance, or impedance of a trailer load associated with first signal contact 130 is typically measured between ground contact 130 and first signal contact 130.

A second signal contact 130 is coupled with tail lamps, clearance lamps/outline marker lamps and registration plate lamp. The second signal contact 130 typically uses a 16 AWG conductor. Conductivity, resistance, or impedance of a trailer load associated with second signal contact 130 is typically measured between ground contact 130 and second signal contact 130.

Third signal contact 130 is coupled with auxiliary +12V power that is typically enabled when the vehicle ignition is on. The third signal contact 130 typically uses a 12 AWG conductor. Conductivity, resistance, or impedance of a trailer load associated with third signal contact 130 is typically measured between ground contact 130 and third signal contact 130.

Fourth signal contact 130 is coupled with a right turn signal, stop lamp. The fourth signal contact 130 typically uses a 16 AWG conductor. Conductivity, resistance, or impedance of a trailer load associated with fourth signal contact 130 is typically measured between ground contact 130 and fourth signal contact 130.

Fifth signal contact 130 is coupled with an electric brake control. The fifth signal contact 130 typically uses a 12 AWG conductor. Conductivity, resistance, or impedance of a trailer load associated with fifth signal contact 130 is typically measured between ground contact 130 and fifth signal contact 130.

Sixth signal contact 130 is coupled with at least one reversing lamp and may include a control signal to block a surge to the trailer brakes when reversing. The sixth signal contact 130 typically uses a 16 AWG conductor. Conductivity, resistance, or impedance of a trailer load associated with sixth signal contact 130 is typically measured between ground contact 130 and sixth signal contact 130.

When detecting conductivity, resistance, or impedance, measurements may be made between the ground contact 130 and another signal contact 130, or measurements may be made between two signal contacts 130. Although the most common failure mode is a resistive path to ground (i.e., resistive path between ground contact 130 and another signal contact 130), wires after prolonged contact and rubbing may also form a resistive path.

A flat 4-way vehicle connector 124 may have a ground contact 130 and signal contacts 130 similar to certain contacts 130 of the round 7-way vehicle connector 124 including contacts for stop lights, turn signals, and running lights.

The trailer 140 is coupled to the vehicle 100 via the hitch 102 (e.g., hitch point) such that the vehicle 100 is able to pull or push the trailer 140 from one location to another location. Trailers are utilized for various purposes including hauling objects (e.g., other vehicles or boats), moving, and camping.

The hitch 102 is configured to receive a coupler of the trailer 140 to couple the trailer 140 to the vehicle 100. The hitch-coupler connection allows the trailer 140 to rotate. The trailer 140 follows the path of the vehicle 100 when the vehicle 100 moves forward. The path of the trailer 140 when the vehicle 100 moves in reverse depends on the direction of force (e.g., due to steering angle) applied by the vehicle 100 at the hitch among other factors.

The trailer 140 includes the trailer electrical system 150. The trailer electrical system 150 includes lights 152 and a trailer connector 154. The trailer connector 154 includes electrical connections or contacts 160 (e.g., corresponding to electrical connections or contacts 130).

The vehicle connector 124 and the trailer connector 154 may be connected such that the contacts 130 are in contact with the contacts 160. The vehicle connector 124 may be a socket and the trailer connector 154 may be a plug.

Once the vehicle connector 124 and the trailer connector 154 are connected, the vehicle 100 can provide power to electrical components of the trailer electrical system 150 in unison with (or independent of) electrical components of the vehicle electrical system 120 and in response to vehicle operations (e.g., brakes, open door). For example, the controller 110 can control the rear lights 122 of the vehicle 100 as well as rear lights 152 and electric brakes of the trailer 140 in response to the brake pedal of the vehicle 100 being engaged.

Control of the lights may be performed by controller 110 or a module such as a Body Control Module (BCM). The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The controller 110 is configured to detect connection between the vehicle connector 124 and the trailer connector 154. In particular the controller 110 applies a voltage across the contacts 130 of the vehicle connector 124 and measures impedance, resistance, conductivity, or another electrical property between the contacts 130.

When detecting conductivity, resistance, or impedance, the controller 110 may compare the determined characteristic with a low threshold and a high threshold. The thresholds may be based on the gauge wire allowed for the trailer. For example, a contact to an 18 gauge wire may have a lower resistance threshold of 3 ohms. If the controller for the contact to the 18 AWG limits by design the current to 3.5 amps, applying Ohm's law provides a minimum resistance of V/I being 12V/3.5 amps or 3.4 ohms. Likewise, for a 16 AWG may have a lower resistance threshold of 2.4 ohms. Here the controller 110 may consider that 16 AWG can carry more current and limit the current to 5 amps resulting in 12/5 or 2.4 ohms. And for 12 AWG, the lower resistance threshold may be 1 ohm.

If the trailer connector 154 is connected to the vehicle connector 124, the additional resistance of the lights 152 (and/or other electrical components) of the trailer electrical system 150 may be detected when the voltage is applied across the contacts 130 of the vehicle connector 124. For example, measurements that fall within a detection range (e.g., between lower and upper thresholds) indicate that the trailer connector 154 is connected to the vehicle connector 124.

However, environmental factors such as corrosion, snow, ice, rain, salt spray, dust, dirt, mud, and/or other debris may create resistance (e.g., resistive paths) between contacts 130 of the vehicle connector 124. As such, measurements between the contacts 130 due to resistive paths may fall within the detection range (e.g., range of impedance) when the trailer connector 154 is not connected to the vehicle connector 124. Here, environmental factors can lead the controller 110 to indicate that a trailer connector 154 is connected to the vehicle connector 124 when in fact it is not.

In addition, the resistive paths may cause the measurements to fall outside of the detection range when the trailer connector 154 is connected to the vehicle connector 124. Here, environmental factors can lead the controller 110 to indicate that the trailer connector 154 is not connected to the vehicle connector 124 when in fact it is.

To reduce or eliminate false positives and false negatives, the controller 110 includes the off-state trailer detection module 200 and the on-state trailer detection module 220 to detect a trailer connection.

The off-state trailer detection module 200 periodically performs an off-state trailer detection method during an off-state of the vehicle 100. For example, the off-state of the vehicle 100 may include when the ignition position is in a locked or off position. The off-state may be characterized as where an engine of the vehicle 100 is not running and/or where a battery of the vehicle 100 does not power accessories or the vehicle electrical system 120.

The off-state trailer detection module 200 is configured to use a voltage pulse to periodically or continuously determine an off-state determination 202 of a trailer connection. The off-state determination 202 is made without a separate event from a user (e.g., without waiting for trailer lights to be powered when the vehicle 100 is in an on-state). Here, a connection between the vehicle connector 124 and the trailer connector 154 may be immediately or quickly detected. The off-state determination 202 may be used for off-state features 204 of the vehicle 100 such as a trailer alarm.

To conserve battery power, the off-state trailer detection module 200 periodically applies low-voltage pulses (e.g., short duration). Low voltage may include a voltage that is lower than the operating voltage or battery voltage of the vehicle 100. For example, low voltage may include 5V or 3.3V and battery voltage may be 12V.

The off-state trailer detection module 200 measures impedance, resistance, conductivity, or another electrical property between the contacts 130 of the vehicle connector 124. If the trailer connector 154 is connected to the vehicle connector 124, the additional resistance may be detected when the measurements that fall within a detection range.

The off-state trailer detection method may be sensitive to environmental factors and differences in trailer electrical systems 150 (e.g., lights, electrical characteristics, and wiring) as these factors may have an effect on the measurements from low-voltage pulses.

A switch 210 is used to determine if use of the off-state determination 202 enabled or disabled for control of the off-state features 204. If the switch 210 is closed, use of the off-state determination 202 is enabled for control of the off-state features 204. If the switch 210 is open, use of the off-state determination 202 is disable for control of the off-state features 204.

The on-state trailer detection module 220 performs an on-state method in response to an on-state event of the vehicle 100. For example, an on-state event includes when the ignition is in an "on" or accessory mode, when the engine of the vehicle 100 is running, at the time of ignition, and any event where the battery powers any accessories (e.g., the vehicle electrical system 120 components) such as opening a door, unlocking the vehicle or an alarm, pressing on the brake, other events that cause the lights to flash or turn on, combinations thereof, and the like.

The on-state trailer detection module 220 measures impedance, resistance, conductivity or another electrical property between the contacts 130 of the vehicle connector 124. If the trailer connector 154 is connected to the vehicle connector 124, the additional resistance may be detected when the measurements fall within a detection range.

In the on-state, the voltage that is applied due to the on-state event may be at or closer to the operating voltage or battery voltage and the duration is longer (e.g., at least two seconds). The on-state trailer detection method is less sensitive to environmental factors and differences in trailer electrical systems 150 (e.g., lights, electrical characteristics, and wiring) as these factors may have less of an effect on the measurements from higher voltage and duration.

The on-state determination 222 is used to determine whether to enable on-state features 224 of the vehicle 100 such as providing voltage or signals to the vehicle connector 124 to control components of the trailer electrical system 150.

In addition, on-state features 224 include setting a notice for the driver. For example, if the on-state determination 222 is that a trailer 140 is connected, an instrument cluster indicates "Trailer Connected." If the on-state determination 222 is that the trailer 140 is disconnected (e.g., if the trailer was previously connected), the instrument cluster indicates "Trailer Disconnected."

The on-state determination 222 is used to determine the reliability of the off-state determination 202. In particular, the on-state determination 222 is compared to the off-state determination 202 to determine whether to open or close the switch 210. If the switch 210 is open, use of the off-state determination 202 is disabled for the off-state features 204. If the switch 210 is closed, use of the off-state determination 202 is enabled for control of the off-state features 204, for example, to control an alarm system during an off-state of the vehicle 100.

To control the switch 210, the XNOR gate 230 may be used. The on-state determination 222 and the off-state determination 202 may be inputs to the XNOR gate 230 and the output of the XNOR gate 230 may be used to control open-closed position of the switch 210.

Here, each of the on-state determination 222 and the off-state determination 202 may be a binary number, for example, with a determination of "not connected" being represented by a "zero" and a determination of "connected" being represented by a "one".

If the determinations 202, 222 are the same, the XNOR gate 230 returns a "one" that is used to close the switch 210. If the determinations 202, 222 are different, the XNOR gate 230 returns a "zero" that is used to open the switch 210.

Accordingly, if the off-state determination 202 agrees with the on-state determination 222, the switch 210 is closed. If the off-state determination 202 disagrees with the on-state determination 222, the switch 210 is open.

Accordingly, use of the off-state determination 202 may be at least temporarily disabled if the off-state determination 202 is different from the on-state determination 222. In other words, the off-state determination 202 may be used until an on-state determination 222 conflicts with the off-state determination 202 and may thereafter be reinstated if the off-state determination 202 agrees with the on-state determination 222.

Figure 3:
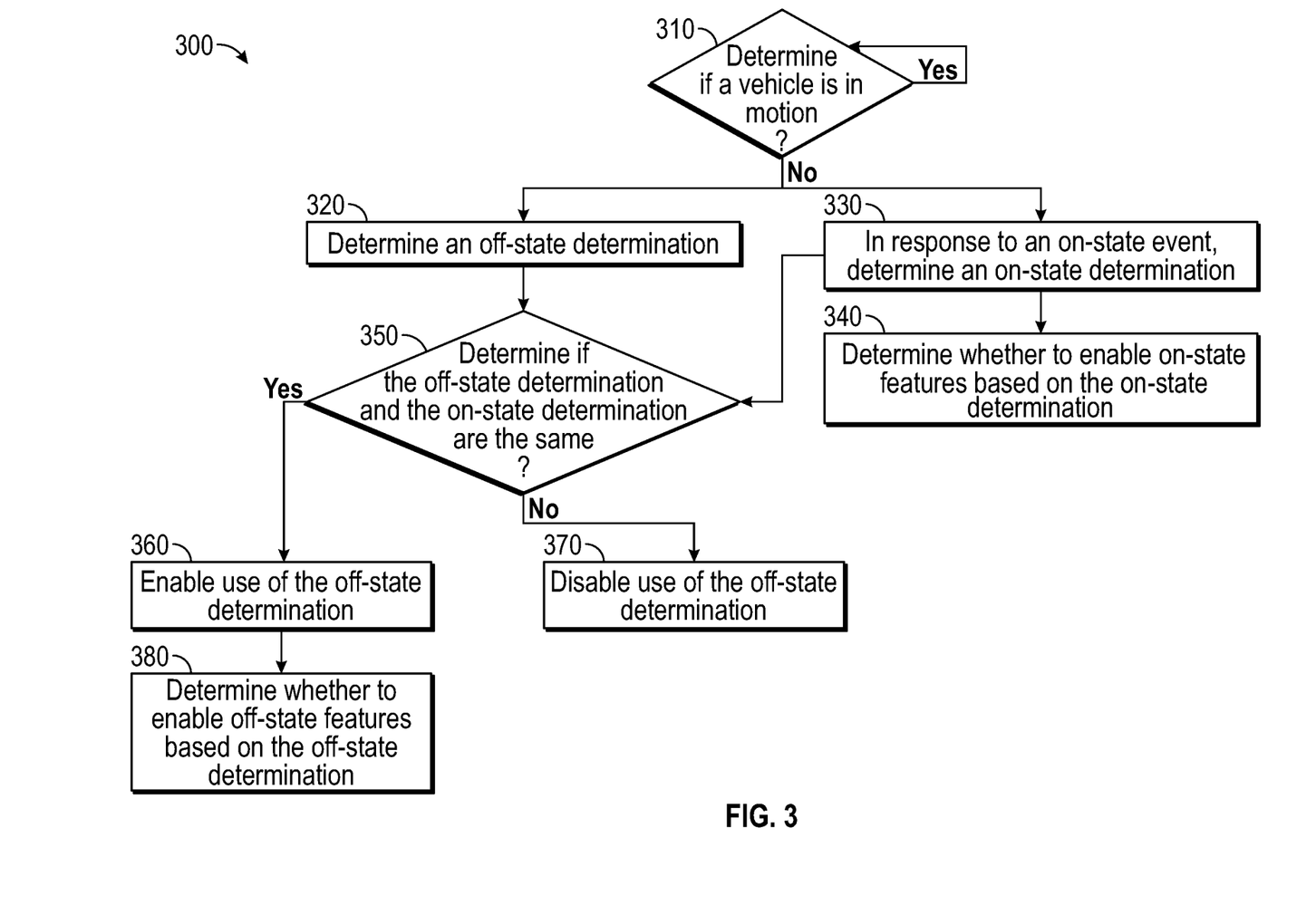
FIG. 3 depicts an exemplary method of determining a trailer connection in accordance with the present disclosure.

Referring to FIG. 3, according to a first step 310 of an exemplary trailer detection method 300, the controller 110 determines if the vehicle 100 is in motion. For example, the controller 110 may determine if a gear selector of the vehicle 100 is in a park setting or if a reading from a speedometer is below a certain threshold (e.g., below 3 mi/h or 5 Km/h).

If the vehicle 100 is in motion, the trailer detection method 300 may continue to periodically determine if the vehicle is in motion. If the vehicle 100 is in motion and no trailer is detected, the off-state trailer detection module 200 may disabled (e.g., not perform the off-state method). If vehicle is in motion and trailer is connected, the off-state trailer detection module 200 performs the off-state method to look for a trailer disconnection.

If the vehicle is not in motion, according to a second step 320, the off-state trailer detection module 200 periodically performs the off-state method during an off-state of the vehicle 100 to determine the off-state determination 202 of whether a trailer connector 154 is connected to the vehicle connector 124.

Additionally, according to a third step 330, in response to an on-state event, the on-state trailer detection module 220 performs an on-state method to determine the on-state determination 222 of whether a trailer connector 154 is connected to the vehicle connector 124.

According to a fourth step 340, determine whether to enable on-state features based on the on-state determination 222.

According to a fifth step 350, determine if the off-state determination 202 and the on-state determination 222 are the same.

According to a sixth step 360, if the determinations 202, 222 are the same, enable use of the off-state determination 202 to determine whether to enable the off-state features 204. According to a seventh step 370, if the determinations 202, 222 are different, disable use of the off-state determination 202 to determine whether to enable the off-state features 204.

According to an eighth step 380, if use of the off-state determination 202 is enabled, determine whether to enable the off-state features 204 based on the off-state determination 202.

The controller 110 may be or be part of an automotive computer.

The controller 110 may include one or more processor(s) and a computer-readable memory. The one or more processor(s) may be disposed in communication with one or more memory devices disposed in communication with the respective computing systems (e.g., the memory and/or one or more external databases). The processor(s) may utilize the memory to store programs in code and/or to store data for performing aspects of methods in accordance with the disclosure (e.g., off-state trailer detection method, on-state trailer detection method, method 300).

The memory may be a non-transitory computer-readable memory storing program code. The memory can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    determining, during a first instance of an off-state, a first instance of an off-state determination of whether a trailer connector is connected to a vehicle connector;
    determining, based on a first instance of an on-state event, a first instance of an on-state determination of whether the trailer connector is connected to the vehicle connector;
    comparing the first instance of the off-state determination and the first instance of the on-state determination; and
    enabling, based on the first instance of the off-state determination and the first instance of the on-state determination matching, use of the off-state determination;
    determining, during a second instance of the off-state, a second instance of the off-state determination of whether the trailer connector is connected to the vehicle connector;

determining, based on a second instance of the on-state event, a second instance of the on-state determination of whether the trailer connector is connected to the vehicle connector;

comparing the second instance of the off-state determination and the second instance of the on-state determination; and disabling, based on the second instance of the off-state determination and the second instance of the on-state determination being different, use of the off-state determination.

2. The method of claim 1, further comprising determining, based on use of the off-state determination being enabled, whether to enable off-state trailer features based on the off-state determination.

3. The method of claim 1, further comprising determining if a vehicle is in motion.

4. The method of claim 3, comprising enabling, if the vehicle is not in motion, the off-state determination and the on-state determination.

5. The method of claim 1, wherein the off-state determination is determined according to an off-state method, wherein the off-state method includes:
applying a voltage pulse across contacts of the vehicle connector;
measuring an electrical property; and
determining if the measurement falls within a detection range of the electrical property.

6. The method of claim 5, wherein the off-state includes at least one of when an ignition position is in a locked or off position, when an engine of is not running, and where a battery does not power accessories or a vehicle electrical system.

7. The method of claim 5, wherein the off-state method is periodically repeated.

8. The method of claim 5, wherein the voltage pulse has a voltage that is less than half of an operating voltage or battery voltage.

9. The method of claim 1, wherein the on-state determination is determined according to an on-state method, wherein the on-state method includes:
applying a voltage across contacts of the vehicle connector;
measuring an electrical property; and
determining if the measurement falls within a detection range of the electrical property.

10. The method of claim 9, wherein the electrical property is at least one of impedance, resistance, and conductivity.

11. The method of claim 9, wherein the voltage is an operating voltage or battery voltage.

12. The method of claim 1, wherein the on-state event includes at least one of an ignition in an "on" or accessory mode, an engine running, an ignition event, and an event where a battery powers an accessory or vehicle electrical system components that causes lights to flash or turn on.

13. The method of claim 1, further comprising determining whether to enable on-state trailer features based on the on-state determination, wherein the on-state trailer features include at least one of providing voltage or signals to the vehicle connector to control components of a trailer electrical system and setting a notice for a driver.

14. A vehicle, comprising:
a vehicle electrical system comprising a vehicle connector, the vehicle connector comprising contacts, wherein the vehicle connector is configured to connect to a trailer connector;

a controller comprising a processor and a memory comprising instructions that, when executed by the processor, cause the processor to:
determine, during a first instance of an off-state, a first instance of an off-state determination of whether the trailer connector is connected to the vehicle connector;
determine, in response to a first instance of an on-state event, a first instance of an on-state determination of whether the trailer connector is connected to the vehicle connector;
determine whether to enable on-state trailer features based on the first instance of the on-state determination;
compare the first instance of the off-state determination and the first instance of the on-state determination;
enable, based on the first instance of the off-state determination and the first instance of the on-state determination matching, use of the off-state determination; or
determine, based on use of the off-state determination being enabled, whether to enable off-state trailer features;
determine, during a second instance of the off-state, a second instance of the off-state determination of whether the trailer connector is connected to the vehicle connector;
determine, in response to a second instance of the on-state event, a second instance of the on-state determination of whether the trailer connector is connected to the vehicle connector;
compare the second instance of the off-state determination and the second instance of the on-state determination; and
disable, based on the second instance of the off-state determination and the second instance of the on-state determination being different, use of the off-state determination.

15. The vehicle of claim 14, wherein the processor is further configured to:
determine if the vehicle is in motion; and
enable, if the vehicle is not in motion, the off-state determination and the on-state determination.

16. The vehicle of claim 14, wherein the off-state determination is determined according to an off-state method, wherein the off-state method includes:
applying a voltage pulse across the contacts of the vehicle connector;
measuring an electrical property; and
determining if the measurement falls within a detection range of the electrical property;
wherein the on-state determination is determined according to an on-state method, wherein the on-state method includes:
applying an on-state voltage across the contacts of the vehicle connector, measuring the electrical property; and
determining if the measurement falls within the detection range of the electrical property and wherein the electrical property is at least one of impedance, resistance, and conductivity.

17. The vehicle of claim 16, wherein an off-state of the vehicle includes at least one of when an ignition position is in a locked or off position, when an engine of the vehicle is not running, and where a battery of the vehicle does not power accessories or the vehicle electrical system.

18. The vehicle of claim 16, wherein the voltage pulse has a voltage that is less than half of an operating voltage or battery voltage of the vehicle, and wherein the on-state voltage is the operating voltage or battery voltage of the vehicle.

19. The vehicle of claim 16, wherein the on-state event includes at least one of an ignition in an "on" or accessory mode, an engine of the vehicle running, an ignition event, and an event where a battery powers an accessory or vehicle electrical system components that causes lights to flash or turn on.

20. The vehicle of claim 16, wherein on-state features include at least one of providing voltage or signals to the vehicle connector to control components of a trailer electrical system and setting a notice for a driver.

\* \* \* \* \*